June 12, 1962

H. INGOLD 3,038,415

PARKING SYSTEM INCLUDING CARRIAGE LOCKING
AND UNLOCKING APPARATUS

Filed June 12, 1958

HANS INGOLD
INVENTOR

BY Leon M. Strauss

HANS INGOLD
INVENTOR

June 12, 1962 H. INGOLD 3,038,415
PARKING SYSTEM INCLUDING CARRIAGE LOCKING
AND UNLOCKING APPARATUS
Filed June 12, 1958 3 Sheets-Sheet 3

HANS INGOLD
INVENTOR
BY

United States Patent Office 3,038,415
Patented June 12, 1962

3,038,415
PARKING SYSTEM INCLUDING CARRIAGE LOCKING AND UNLOCKING APPARATUS
Hans Ingold, Hofackerstrasse 7, Zurich, Switzerland
Filed June 12, 1958, Ser. No. 741,524
Claims priority, application Switzerland July 15, 1957
5 Claims. (Cl. 104—48)

This invention relates to a garage structure for automotive vehicles and in particular to a novel parking system affording means for conveniently storing and discharging automotive vehicles.

It is one of the important objects of the present invention to provide means facilitating automotive vehicles to be easily stored within and readily discharged from a garage or like area without regard to the location of storage or discharge of the vehicle.

It is another object of the present invention to provide means affording storage space for a great number of automotive vehicles or the like in a very small area yet which permits the vehicle to be stored or discharged at will and with minimum loss of time.

It is a further object of the present invention to provide means allowing the movement of a platform on which a vehicle is loaded to be made in a predetermined direction with great ease.

An additional and important object of the present invention is to provide means facilitating the locking of adjacent platforms together so as to reduce jars and shocks to the platforms and to vehicles thereon during the motion of the platforms, thereby affording great protection for the stored vehicles.

Still another object of the invention resides in the provision of means facilitating the disengagement of latching means holding platforms in a locked position, whereby individual platforms may be more easily moved.

A still further object of the present invention is to provide means affording a seal for the pneumatically actuated decoupling means so that a compressed air arrangement can be employed without fear of foreign matter reaching the compressed air cylinder, thus eliminating the possibility of explosions or other disadvantageous results of the proximity of gasoline, hydraulic transmission fluid, dirt, and other foreign matter to a source of compressed air.

A further object of the present invention is to provide means ensuring speedy and uniform operation, reduction of inertia of moving parts, simplicity and economy of construction, and greater adaptability of the vehicle garage system to different fields of use, such as warehouses, parts storage systems, etc.

Yet a further object of the present invention is to provide means contributing to a strong, durable and efficient, compact and conveniently operated storage system which requires only a minimum of manipulations either by hand or through a remote control system to bring about access to any location of given area for loading or discharging a vehicle.

Still futher objects and features of the present invention reside in the provision of a garage structure involving only relatively simple elements, such as platforms, to thereby provide means for receiving a vehicle and for discharging a vehicle.

These together with various ancillary objects and features of the invention, which will become apparent as the following description proceeds, are attained by this storage system, a preferred arrangement of which is shown in the accompanying drawings, by way of example only, wherein.

Figure 1:
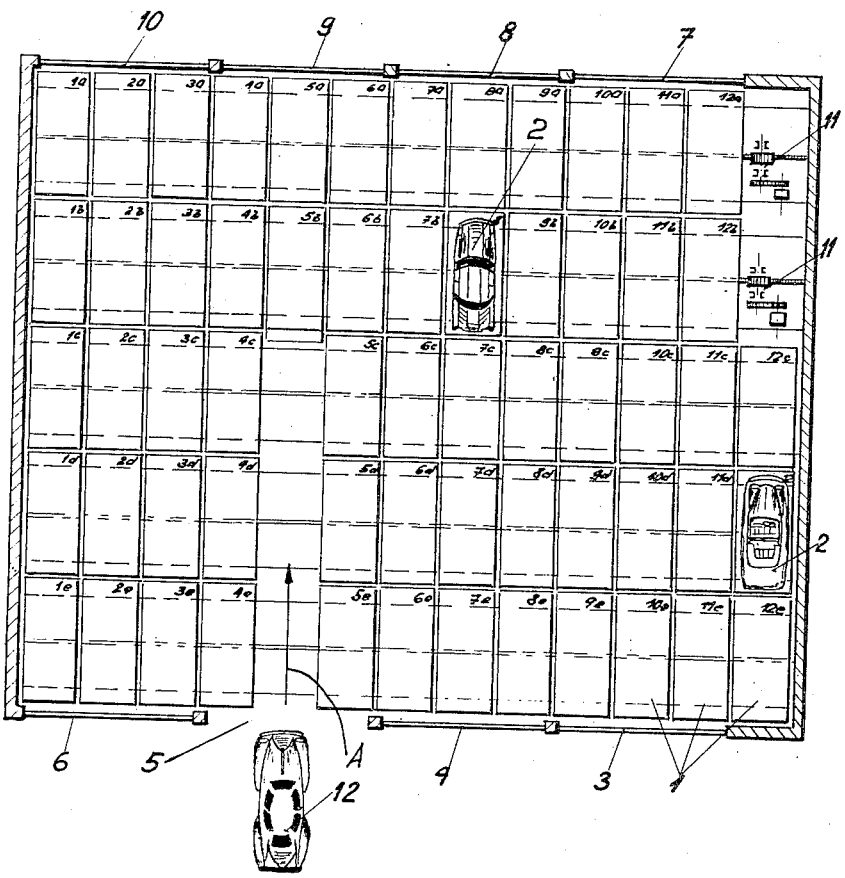
FIG. 1 is a schematic horizontal sectional view of a garage or other building employing the storage system of the present invention, particularly illustrating the relative arrangement of the platforms and spaces therefor.

With continuing reference to the accompanying drawings wherein like reference numerals designate similar parts throughout the various views, and with initial attention directed to FIG. 1, it will be noted that therein is shown a building for use as a parking garage or the like into which a plurality of platforms 1 are adapted to pass. The platform 1 is adapted to have vehicles, such as are indicated at 2, positioned thereon. The building as shown in FIG. 1 is provided with 65 equal rectangular spaces and it is noted that there are shown within the building 60 platforms 1. Obviously, any suitable number of platforms and spaces may be employed, the platforms being separately indicated by reference characters 1a to 12a, 1b to 12b, 1c to 12c, 1d to 12d, and 1e and 12e.

The building is defined by outer peripheral walls, such as are indicated at 3, 4, 5, 6, 7, 8, 9, and 10, each of which walls may be removed, raised, lowered or otherwise opened to provide convenient access to the building. Of course, a reduced number of entrances and exits may be utilized in a particular arrangement as may be desired, only the wall section 5 being in an open position in FIG. 1, so that a vehicle 12 may pass into the building in the direction of the arrow indicated at A. Instead of a wall, a gate, door or the like may be employed.

Within the building a suitable drive means 11 for moving the platforms 1 in any desired direction is provided, the construction of the drive means 11 being conventional or of the type disclosed in the patent to H. Ingold No. 2,762,515 issued September 11, 1956.

Figure 2:
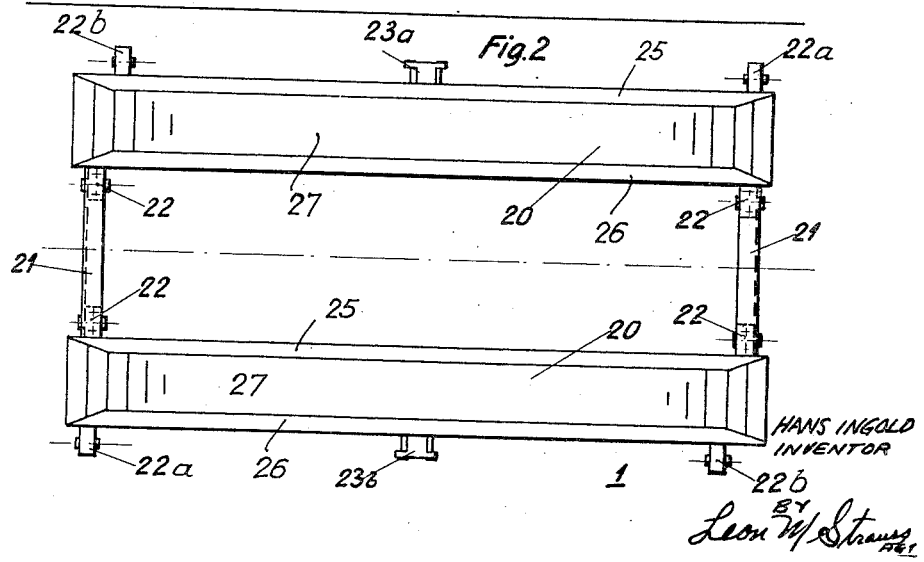
FIG. 2 is an enlarged plan view of one of the platforms employed in the present invention.

Referring now to FIG. 2, it will be noted that each of the platforms 1 includes a pair of trays 20 having spaced side walls 25, 26, and a bottom 27. Each of the trays is adapted to receive one front and one rear wheel of a vehicle thereon, and any suitable means may be employed for holding a vehicle securely within the trays 20.

The trays are positioned on and secured to carriages 21. The carriages 21 are provided with sets of casters or other wheels 22. In addition, the trays are provided with other wheels or casters 22a in alignment with the carriages 21 and wheels or casters 22b out of alignment therewith, thus providing a greater supporting area for the carriages while permitting the beams 23a and 23b secured to the trays 20 to be moved immediately adjacent each other without hindrance by the wheels 22a and 22b.

Each of the beams 23a and 23b is arranged to carry latching means for holding platforms 1 in locked relation to each other so that relative motion between adjacent platforms is reduced to a minimum to eliminate the possibility of shocks being transmitted to vehicles on the platforms causing unwanted accidents or damage to the vehicles on the platforms or to the platforms themselves.

Figure 3:
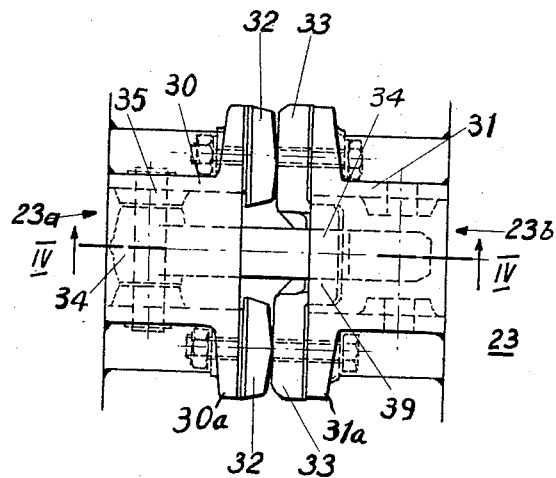
FIG. 3 is an enlarged plan view of the latching or coupling means employed in the present invention for holding two or more platforms together.
Figure 4:
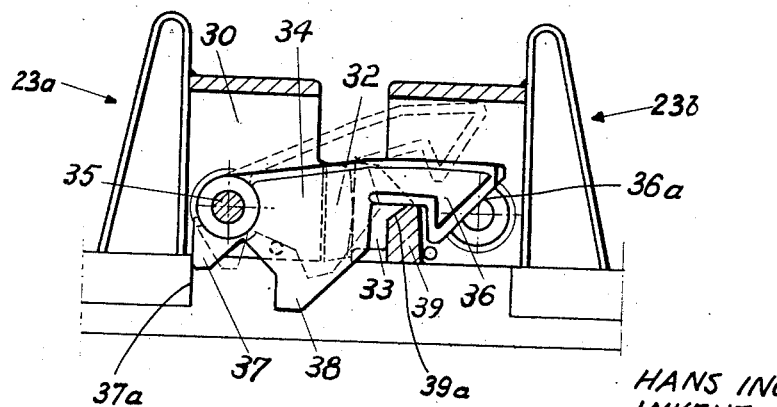
FIG. 4 is a vertical sectional view of the latching means shown in FIG. 3 as taken along the plane of line IV—IV in FIG. 3.
Figure 5:
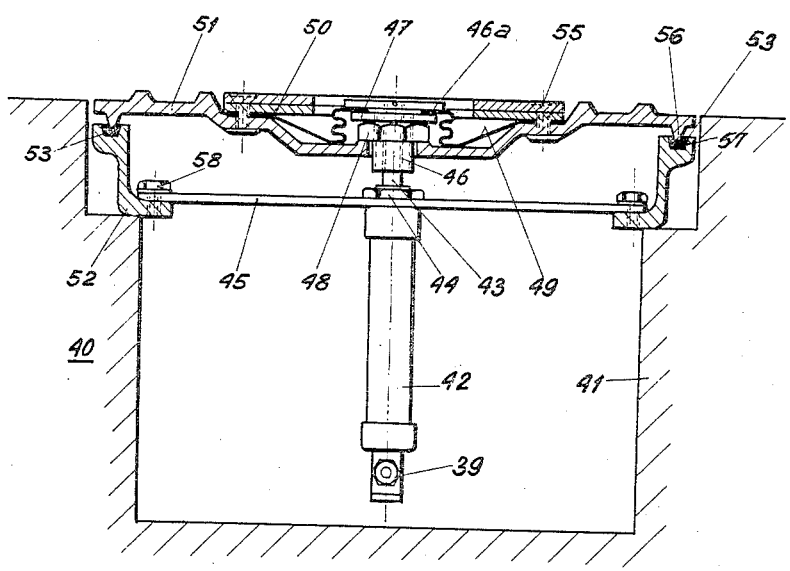
FIG. 5 is a vertical sectional detail view illustrating the construction of the decoupling means employed for disengaging the latching means locking platforms together.
Figure 6:
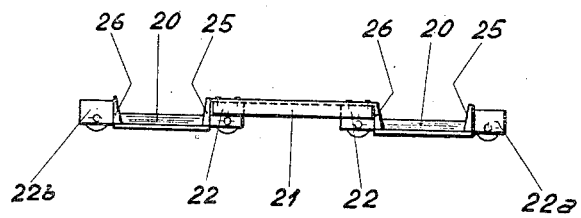
FIG. 6 is an end elevational view of a carriage used in the invention.

As shown in FIGS. 3 and 4, the beams 23a and 23b have inverted channel-shaped members 30 and 31 formed of relatively strong material fixed as by welding or otherwise secured thereon. These channel members terminate in flanges 30a and 31a and the channel member 30 has elastic buffers or abutments secured thereto as by bolts or other suitable fastening means. Elastic buffers or abutments 33 are fixed to the channel member 31 and all of the elastic or resilient buffers are engaged with adjacent buffers under compression when adjacent platforms are locked together.

A first latch member 34 is pivotally secured to the channel member 30 by means of a shaft or pin 35 and includes a hook 36 having a cam surface 36a. The first latch member 34 further includes a stop 37 engageable with the portion 37a of beam 23a and includes a downwardly extending projection 38.

A second latch member or stationary catch 39 is fixed to the beam 23b. When latch member 34 is disengaged it is retained in the horizontally extending position so that the cam surface 36a can cooperate with the cam surface 39a on the stationary catch 39 when latch member 34 is brought against the stationary catch 39 so as to raise the latch member 34 until the hook 36 can be engaged thereover, whence it will fall into the position as is shown in FIG. 4.

In order to disengage the latch member 34 from the stationary catch 39, there is provided a decoupling means 40. This decoupling means 40 is mounted in any convenient manner within the bottom or bed 41 of the parking garage. The decoupling means 40 includes a pneumatic or compressed fluid operated actuator and this actuator includes a cylinder 42 in which a piston is provided, the piston having a plunger or piston rod 43 extending outwardly of the cylinder, which carries a nut 44 engageable with the lower sheet 45 provided for closing and opening the bed 41 in which the cylinder 42 is located.

The plunger 43 further carries a sleeve 46 and has a flange 46a fixed to the top thereof. The plunger is externally threaded and another nut 48 is threadedly secured thereon clampingly holding a bellows 49 between the flange 46a and the disc 47.

The bellows is disc-shaped at its outer rim and is held between the double cover plate 50 and the upper plate 51 by means of any suitable fasteners 55. The plate 51 is provided with a downwardly extending peripheral tongue 56 which seats on a fluid tight seal 53 within a groove 57 provided in the housing 52 to which there is secured by means of bolts 58 the lower sheet 45.

A fitting 39 is connected to the cylinder 42 to provide compressed air or other suitable fluid to the cylinder 42 to thereby actuate the plunger 43. Of course, suitable valve means (not shown) may be provided for controlling the introduction of the fluid to the cylinder 42 and for draining fluid therefrom to effectuate the return of the plunger 43.

A seal (not shown) may be further provided to entirely cover the decoupling means 40. This other seal means may be formed of synthetic rubber or the like, as is the bellows 49. The bellows 49 together with closure plate 51 and the associated housing 52, seal 53, and lower sheet 45 function to shield the compressed air cylinder 42 from foreign matter, such as water, dirt, and particularly from gasoline, oil, transmission and differential fluid, as well as brake fluid, which might otherwise result in dangerous situations, thus eliminating the possibility of explosions resulting from the presence of highly combustible material in the presence of compressed air.

In operation, a vehicle is driven into the parking garage through an opening such as shown at 5. The vehicle moves in the direction indicated by the arrow A until it is driven on the platform such as 5b. Then, the drive means 11 can be used to displace the platform out of alignment with this entrance and to permit an empty platform 1 to receive another vehicle thereon.

When the loaded platforms are moved into engagement with each other, the hook 36 will engage through cam action of the parts 36a and 39a over the stationary catch 39. When it is desired to separate the platforms during further loading or discharging operations, either by manual operation or by remote control operation, fluid is introduced into cylinder 42. This causes the flange 46a to be raised into engagement with the projection 38 moving the latch member 34 into the position as is shown in phantom lines in FIG. 4. This causes the platforms to become disengaged.

Thus it can be seen that there has been disclosed a parking system including a plurality of platforms 1 together with means 11 connected to the platforms for moving the platforms in predetermined direction, latch means 34, 39 attached to the platforms for locking the platforms together, and fluid actuated decoupling means 40 disposed beneath the platforms in the bottom 41 engageable with the latch means 34, 39 to separate the platforms. The latch means is recited as including a first latch member 34 pivoted as at 35 to the beam 23a, and a second latch member 39 fixed to the beam 23b, the first latch member having a hook 36 engageable over the second latch member 39 and having a downwardly extending projection 38.

There has been further defined the fluid actuated means 40 including the plunger 43, 46a engageable with the projection 38 to raise the first latch member 34 to disengage the hook 36 from the stationary latch or second latch member 39.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A platform for parking cars comprising spaced parallel trays, cross members joining said trays, roller means supporting said trays above ground for moving said trays, bracket means extending outwardly from each side thereof, one of said bracket means including an upstanding member, the other including a latch pivotally mounted thereon and including a hook portion engageable with the upstand member of an adjacent platform, said latch and said upstanding member having cooperating camming surfaces including engageable portions slidable to deflect said latch over said upstanding member into engagement therewith when two platforms are moved together, said latch member including a projection extending downwardly below said bracket means and disposed between said platforms whereby to permit said projection to be engaged by apparatus for unlatching said platform which is adapted to move beneath the platform to contact the projection of said latch and lift the hook portion thereof off said upstanding member.

2. A platform for parking cars according to claim 1, wherein said bracket means includes spaced side members, and a bolt extending between said spaced side members, said latch being rotatably mounted on said bolt.

3. A platform for parking cars according to claim 2, wherein said bracket means includes an upstanding member located between said side members.

4. In a parking system: a supporting structure including walls defining a recessed bed, a cover over said bed having a recess and an opening in said recess, a pair of platforms above said bed, means connected to said platform for moving said platforms in predetermined directions, latch means attached to said platforms for locking said platforms together, the improvement comprising fluid actuated decoupling means disposed beneath the surface of said platforms in said bed and including a portion extendable through said cover opening and engageable with said latch means for disengaging said latch means to separate said platforms, said fluid actuated means including a cylinder and a piston therein actuated by fluid under pressure in said cylinder, a plunger connected to said piston engageable with said latch means, and sealing means including a bellows connected to said plunger and extending outwardly therefrom to surround said plunger and to cover the recess of said cover for shielding said cylinder from foreign matter.

5. A platform in a parking system according to claim 4, wherein said latch means and said platform each includes opposed complementary inclined surfaces to permit sliding engagement of said surfaces and deflection of the latch surface over the platform surface when two platforms are moved together.

References Cited in the file of this patent
UNITED STATES PATENTS

| | | |
|---|---|---|
| 489,978 | McCord | Jan. 17, 1893 |
| 754,387 | Price | Mar. 8, 1904 |
| 789,491 | Flannery | May 9, 1905 |
| 1,610,366 | Fox et al. | Dec. 14, 1926 |
| 1,861,659 | Fox | June 7, 1932 |
| 1,887,667 | Wheeler | Nov. 15, 1932 |
| 1,897,362 | Daniels | Feb. 14, 1933 |
| 2,031,392 | Taylor | Feb. 18, 1936 |
| 2,153,107 | Torma | Apr. 4, 1939 |
| 2,190,737 | Schroeder | Feb. 20, 1940 |
| 2,267,495 | Einwaechter et al. | Dec. 23, 1941 |
| 2,430,517 | Lunde | Nov. 11, 1947 |
| 2,602,557 | Sinclair | July 8, 1952 |
| 2,762,515 | Ingold | Sept. 11, 1956 |
| 2,811,112 | Rieder | Oct. 29, 1957 |

FOREIGN PATENTS

| | | |
|---|---|---|
| 917,656 | France | Sept. 16, 1946 |